United States Patent [19]

Krohn et al.

[11] Patent Number: 5,221,308
[45] Date of Patent: Jun. 22, 1993

[54] LOW LOSS INFRARED TRANSMITTING HOLLOW CORE OPTICAL FIBER METHOD OF MANUFACTURE

[75] Inventors: David A. Krohn; Trevor MacDougall, both of Hamden; Paul Sanders, Guilford; Mokhtar S. Maklad, Milford, all of Conn.

[73] Assignee: 3M, St. Paul, Minn.

[21] Appl. No.: 595,706

[22] Filed: Oct. 9, 1990

Related U.S. Application Data

[63] Continuation of Ser. No. 247,749, Sep. 21, 1988, abandoned.

[51] Int. Cl.$^5$ .................................................. G02B 6/20
[52] U.S. Cl. ....................................... 65/3.12; 385/125
[58] Field of Search ...................... 65/3.12; 350/96.32; 385/125

[56] References Cited

U.S. PATENT DOCUMENTS

| | | | |
|---|---|---|---|
| 3,973,828 | 8/1976 | Onoda et al. | 350/96.32 |
| 4,067,709 | 1/1978 | Stanton | 350/96.32 |
| 4,114,980 | 9/1978 | Asam et al. | 65/3.12 |
| 4,453,803 | 6/1984 | Hidaka et al. | 350/96.32 |
| 4,778,249 | 10/1988 | Worrell | 350/96.32 |

FOREIGN PATENT DOCUMENTS

61-188506  8/1986  Japan ................. 350/96.32

Primary Examiner—Peter Kratz
Attorney, Agent, or Firm—Darby & Darby

[57] ABSTRACT

A method of producing a hollow core optical fiber comprises the steps of depositing a thermal buffer layer on the interior wall of a silica tube, depositing a film of germanium silicate cladding on said buffer layer, heating the composite structure so formed to its drawing temperature, and drawing the heated composite structure to form a hollow core optical fiber.

3 Claims, 1 Drawing Sheet

LOW LOSS INFRARED TRANSMITTING HOLLOW CORE OPTICAL FIBER METHOD OF MANUFACTURE

This is a continuation of application Ser. No. 247,749, filed Sep. 21, 1988 now abandoned.

This invention relates to hollow core optical fibers. More particularly, this invention relates to a hollow core optical fiber of particular utility in transmitting optical frequencies in the mid infrared range.

BACKGROUND OF THE INVENTION

Carbon dioxide lasers are widely used for surgery, cutting and welding of metals and military applications. The wavelength of a $CO_2$ laser is in the range of about 9-11 um. While there are currently seven available $CO_2$ laser frequencies, the most commonly used wavelength is 10.6 um.

Problems have been encountered in producing optical fibers suitable for transmission of light from a $CO_2$ laser because of difficulties encountered in fabricating a fiber with the necessary characteristics. Currently, it appears that a hollow core fiber may be particularly useful for this purpose. See, for example, Hidaka et al U.S. Pat. No. 4,453,803.

In any optical fiber, the cladding must have an index of refraction lower than that of the core so that total internal reflection occurs between the core and cladding interface to confine the light energy to the core. In a hollow core fiber, the core is air which has an index of refraction of one; therefore, the cladding material of a hollow core fiber for use with a $CO_2$ laser must have a refractive index less than one in the mid infrared spectral region.

Hidaka et al (supra) have proposed a hollow core optical fiber for $CO_2$ laser transmission in which the cladding consists of germanium dioxide, zinc oxide and potassium oxide glass. However, conventional methods used to manufacture such glass compositions give rise to problems in maintaining high geometrical tolerances and purity. As a result, hollow waveguides fabricated with this composition by conventional techniques tend to exhibit performance limitations due to these problems. Entrained glass contaminants, usually in the form of air bubbles, coupled with variations in bore dimensions and circularity result in high attenuation and adverse heating effects that can cause thermal failure.

Vapor deposition processes have been developed for the fiberoptic telecommunications industry. These methods involve oxidation of reagent vapors to form a soot product which is subsequently consolidated into a high purity glass. Because the starting reagent materials are in the form of high purity gases or liquids, glass made by vapor deposition methods exhibit extremely high purity levels. Moreover, very high dimensional tolerances can be obtained using known vapor deposition manufacturing technology and equipment.

Despite the benefits of vapor deposition processes, they have a disadvantage in that they are limited in glass composition range. Because the starting materials in a vapor deposition process are transported in a vapor phase before oxidation, the starting materials must generally be volatile at less than 200° C. in order to be processed. Glass compositions of the $GeO_2$—$ZnO$—$K_2O$ type are very difficult to fabricate by vapor deposition processes because the zinc and potassium components are not readily available in volatile compounds or volatile organo metallic form. Hence, despite the benefits available from vapor deposition processes, such processes are not known to have been used in the manufacture of hollow core optical fibers.

An object of the present invention is to provide a method of manufacturing hollow core optical fibers of very pure glass materials and uniform dimensions.

Another object is to provide a glass composition for use as the cladding material in a hollow core optical fiber wherein the components of such composition are conveniently available in volatile form such that the cladding can be formed by vapor deposition processes.

A further object is to provide novel cladding compositions for a hollow core optical fiber which can be "tuned" by selection of components to various frequencies in the mid infrared spectral range.

SUMMARY OF THE INVENTION

In accordance with the invention, a cladding material having an index of refraction less than one is vapor deposited on the inner wall of a silica tube. In the preferred embodiment of the invention, the cladding material comprises a germanium dioxide-silicon dioxide composition which is deposited by a modified chemical vapor deposition process on the inside of substrate tubing to a preselected thickness. The hollow fiber is then drawn from this coated tube.

DETAILED DESCRIPTION

The wavelength for pure $SiO_2$ glass at which minimum waveguide transmission loss occurs is lower than the wavelength at which minimum waveguide transmission loss occurs for $GeO_2$ glass. Surprisingly, it has been found that the addition of $GeO_2$ to $SiO_2$ lowers the wavelength at which minimum waveguide transmission loss occurs into the mid infrared range. Germanium silicate has an index of refraction less than one and is therefore well suited for use as the cladding material of a hollow core optical fiber used to transmit light from a $CO_2$ laser.

In accordance with the invention, germanium silicate glass is vapor deposited on the inner wall of a silica tube. This may be done by conventional processes such as radio frequency sputtering, low pressure plasma chemical vapor deposition processes or high pressure plasma chemical vapor deposition. In the preferred embodiment, both the germanium silicate and a buffer layer, which serves to reduce the thermal mismatch between the germanium silicate and the silica tube, are vapor deposited.

Figure 1:
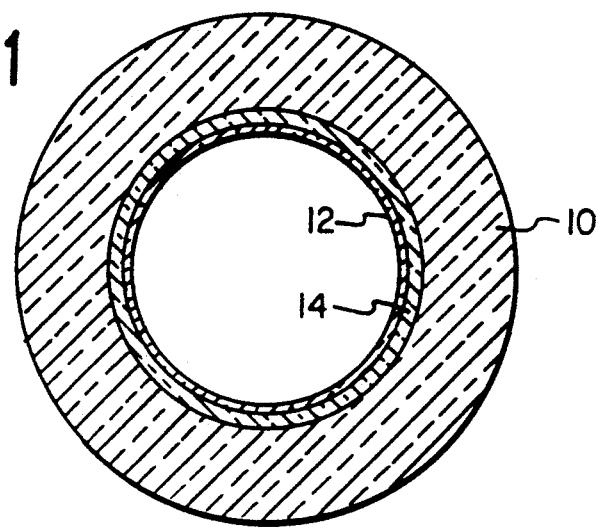
FIG. 1 shows a cross-sectional view of an optical fiber in accordance with the invention.

Referring to FIG. 1, the configuration of the preform is shown before drawing. The silica substrate or tube is shown at 10 and the inner cladding liner at 12. If the germanium silicate cladding 12 is deposited directly on the silica tube 10, a thermal expansion mismatch can occur causing high stress and, as a consequence, a mechanically fragile structure. To overcome this problem, a buffer layer 14 is vapor deposited on the tube 10 before depositing the cladding 12. Buffer layer 14 may be graded from a low thermal expansion coefficient close to the silica tube 10 to a higher thermal expansion coefficient at the germanium silicate cladding 12. The buffer may comprise a silica glass with increasing amounts of a dopant such as boron to vary the thermal expansion.

amounts of material in the vapor phase and is not an actual measured value.

TABLE I

| Ex. | Composition* (wt. %) | SiCl4 (cc/min) | GeCl4 (cc/min) | O2 (cc/min) | He (cc/min) | Other (cc/min) |
|---|---|---|---|---|---|---|
| 1. | 49Si/49Ge/2As | 100 | 307 | 1350 | 1000 | 106 AsCl3 |
| 2. | 47Si/47Ge/6As | 100 | 307 | 1350 | 1000 | 335 AsCl3 |
| 3. | 49Si/49Ge/2Sb | 100 | 307 | 1350 | 1000 | 392 SbCl5 |
| 4. | 47Si/47Ge/6Sb | 100 | 307 | 1350 | 1000 | 1000 SbCl5 |
| 5. | 49Si/49Ge/2Ti | 100 | 307 | 1350 | 1000 | 78 TiCl4 |
| 6. | 47Si/47Ge/6Ti | 100 | 307 | 1350 | 1000 | 245 TiCl4 |
| 7. | 49Si/49Ge/2F | 100 | 307 | 1350 | 1000 | 5 SiF4 |
| 8. | 47Si/47Ge/6F | 100 | 307 | 1350 | 1000 | 15 SiF4 |
| 9. | 50Si/50Ge | 100 | 307 | 1350 | 1000 | — |
| 10. | 55Ge/45Si | 100 | 375 | 1350 | 100 | — |
| 11. | 57Ge/43Si | 100 | 407 | 1350 | 1000 | — |
| 12. | 60Ge/40Si | 100 | 461 | 1350 | 1000 | — |

*Vapor phase

The fact that the cladding 12 is on the inside of a silica tube 10 may prove to be advantageous in certain applications where it is desired to transmit light from a $CO_2$ laser. The glass tube 10 itself can be used to transmit optical energy (e.g., visible laser energy) to permit the fiber to be aimed prior to triggering of the $CO_2$ laser.

In the preferred embodiment, a modified chemical vapor deposition technique commonly used in the production of telecommunication grade silica optical fibers is employed to deposit buffer layer 14 and the cladding 12. This process involves externally heating the high purity tube 10 to cause the vapor phase oxidation of reagent metal halide gases which flow through the tube. The oxidation of these vapors produces submicron glass microspheres or soot particulates which flow downstream from the heated reaction zone. As the hot glass particulates come in contact with the cooler walls of the substrate tube, they thermophoretically deposit as a porous glass layer on the inside wall of the tube 10. The heat zone is steadily moved toward the downstream portion of the tube and as it passes over the soot deposit, it sinters the porous layer into a clear glass film. When the heat zone reaches the exhaust end of the tube, it is quickly returned to the inlet end and the process repeated a number of times. By varying both the number of deposition cycles and the composition of the gas mix, the incorporation of a wide range of glass structures and composition can be achieved with this process. MCVD vapor deposited glasses are characteristically very pure and free of inclusions such as bubbles, seeds and contaminants that result in light scattering sites which cause harmful heating effects.

In one example of the preferred embodiment, buffer layer 12 was deposited in twenty-five passes. $SiCl_4$ was introduced into the silica tube 10 at a rate of 290 cc per minute with $GeCL_4$ flowing at a rate of 50 cc per minute during each pass. $BCL_3$ was introduced in the first pass at a rate of 15 cc per minute and increased by 1 cc per minute for each pass to a maximum of 40 cc per minute in the twenty-fifth pass. In each pass, oxygen was introduced at a flow rate of 1350 cc per minute and helium at a flow rate of 1000 cc per minute.

After the buffer layer was applied, the cladding material was introduced. Table 1 below sets forth twelve different compositions applied as the cladding 12 in accordance with the invention. In Table 1, the second through fifth columns represent the rate (cc per minute) at which the indicated component is introduced into the preform. The first column entitled "Composition" is an estimate of the final glass composition based on the Experimental results have shown an ability to tune the composition for optimum transmission to a specific wavelength generally within the range of 10 to 11 um. The minimum los wave length was found to obey the following relationship $\lambda_{min\text{-}loss} = 11.675$ um $-0.0188$ (% of GeO in the cladding)

Specifically, it is possible to provide improved optical transmission at 10.6 um with some of the compositions tested, as explained below. The principal factor in tuning the cladding composition is the ratio of germania to silica with the amount of germania optimally as high as 60% although the principals of the invention may be applied with a germania content as high as 100%. Optimally, the silica content should be between 40 and 50% by weight.

It is known that the addition of alkali dopants to germania glasses can tune wave guide cladding glass compositions for optimal optical transmission at 10.6 um. However, available reagent alkali materials are not compatible with the volatile metal halide compounds required in the MCVD process. Experiments have been conducted with large ion dopants chosen by virtue of the compatibility of reagent materials with the MCVD technique and the anticipated shift of the minimum optical loss to the longer wavelengths. For example, $TiCl_4$, $SbCl_3$, $AsCl_3$ and $SiF_4$ may be introduced during the MCVD process as source materials to incorporate the heavy metal oxide compounds and fluorine ion. In tests conducted with the level of the dopant at two weight percent and six weight percent in a 50% germania—50% silica host glass wave guide, it was possible to tune the frequency at which minimum optical loss occurred.

Figure 2:
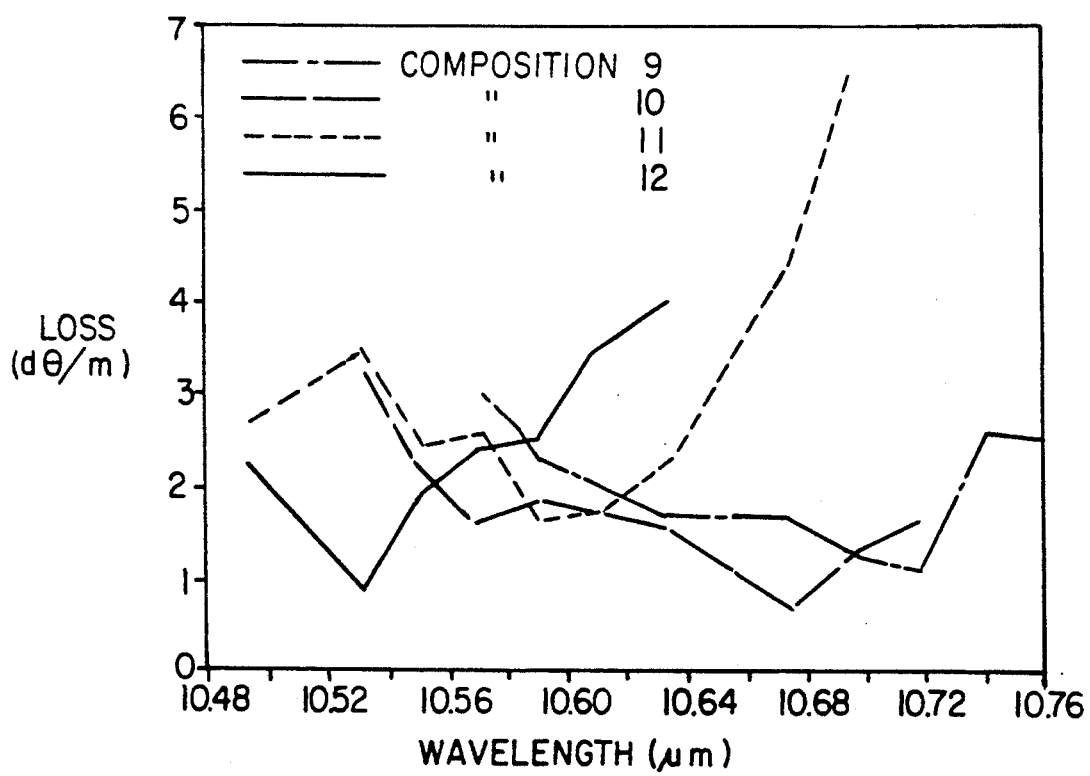
FIG. 2 is a graph showing the relationship between wavelength and transmission loss for four compositions in accordance with the invention.

Of the twelve compositions listed in Table 1, compositions Nos. 9–12, which were undoped, were found to be the best. The loss for each of these compositions was measured to determine the wavelength at which the minimum transmission loss occurs. FIG. 2 shows that as the amount of silicon decreases, the minimum loss wavelength also decreases. At a wavelength of 10.6 um (the most commonly used $CO_2$ laser frequency), the best composition was composition No. 11 (57% $GeO_2$ and 43% $SiO_2$).

The compositions tested were made from a preform having a bore size of 19 mm. The thickness of silica substrate 10 was 1.695 mm. The graded buffer layer 14 was 0.34 mm thick and the cladding liner 12 was 0.225 mm thick. The preform was then drawn at a temperature of 3760° F. to a core diameter of 1000 um with all other dimensions being reduced proportionately.

Waveguides manufactured in accordance with the invention show satisfactory bend performance (1.6 dB induced loss for one meter bend radius over ¼ meter length). Such performance would enable a waveguide manufactured in accordance with the invention to replace articulating arms commonly used for surgical and other medical purposes. Moreover, the preferred germanium silicate compositions are non-toxic and environmentally stable which means that they may also be used in in vivo applications.

The invention may also be used with an outside vapor deposition (OVD) process. The OVD process is commonly used to produce high purity glass for many types of optical fibers and would tend to avoid the problems of thermal expansion mismatch of the optical clad and substrate glasses encountered in the MCVD process.

The OVD process involves reacting metal halide vapors in an oxyhydrogen flame to form a hot stream of glass powder or soot. The stream of soot is aimed at and traversed across a rotating target rod to which the soot adheres causing layers to be built up until a porous glass pre-form is produced. The porous pre-form is then removed from the target rod and zone sintered under a controlled atmosphere in a high temperature furnace to produce a clear glass pre-form ready for fiber drawing.

The target rod may be made of a glass that will not be removed before sintering but instead will become an integral part of the pre-form and subsequent fiber. In normal OVD processes, the removable target rod has a small diameter (1-5 mm) resulting in a finished pre-form having a small axial bore which normally disappears when the fiber is drawn at high temperature. In order to produce a hollow fiber, the starting pre-form should be a thin wall tube having a relatively large inside diameter. For example, using the OVD process to manufacture hollow core fibers, the target rods used may be between 20 and 25 mm in diameter. Experiments have been conducted with a 20 mm (outer diameter) quartz tube as the target rod and a slightly tapered graphite rod (25 mm to 22 mm). Using the graphite rod, the deposited soot was sintered in a helium purged atmosphere while still on the graphite target. The graphite rod could then removed from the sintered glass upon cooling.

What is claimed is:

1. A method of manufacturing a hollow core optical fiber, comprising the steps of vapor depositing a layer of glass cladding material comprising $GeO_2$ doped with $SiO_2$ on the wall of a supporting structure, said cladding material having a refractive index less than one and about 49-60% $GeO_2$ and about 40-50% by weight of $SiO_2$, heating at least the layer of glass cladding material to drawing temperature and drawing at least said cladding material to reduce its cross-sectional area while maintaining a hollow core of pre-determined diameter.

2. A method of manufacturing a hollow core optical fiber comprising the steps of vapor depositing a layer of glass cladding material comprising $GeO_2$ doped with $SiO_2$ on the interior wall of a glass tube, said cladding material having a refractive index less than one and about 49-60% $GeO_2$ and about 40-50% by weight of $SiO_2$, heating the composite structure so formed to drawing temperature and drawing the heated composite structure to reduce its cross-sectional area while maintaining a hollow core of predetermined diameter.

3. A method of manufacturing a hollow core optical fiber comprising the steps of vapor depositing a thermal buffer layer on the interior wall of a glass tube, vapor depositing a layer of glass cladding material comprising $GeO_2$ doped with $SiO_2$ on said thermal buffer layer, said cladding material having a refractive index less than one and about 49-60% $GeO_2$ and about 40-50% by weight of $SiO_2$, heating the composite structure so formed to drawing temperature and drawing the heated composite structure to reduce its cross-sectional area while maintaining a hollow core of predetermined diameter.

* * * * *

UNITED STATES PATENT AND TRADEMARK OFFICE
CERTIFICATE OF CORRECTION

PATENT NO.: 5,221,308

DATED: June 22, 1993

INVENTOR(S): David A. Krohn, Trevor MacDougall, Paul Sanders, and Mokhtar S. Maklad It is certified that error appears in the above-identified patent and that said Letters Patent is hereby corrected as shown below:

Col. 1, line 5, please insert

-- <u>STATEMENT OF FEDERALLY SPONSORED RESEARCH AND DEVELOPMENT</u>

The U.S. government has a paid-up license in this invention and the right in limited circumstances to require the patent owner to license others under reasonable terms as provided for by the terms of Contract No. DE-AC01-85ER80325 awarded by the United States Department of Energy (DOE).--.

Signed and Sealed this

Third Day of June, 1997

*Attest:*

BRUCE LEHMAN

*Attesting Officer*  Commissioner of Patents and Trademarks